(12) United States Patent
Craik et al.

(10) Patent No.: US 10,055,210 B2
(45) Date of Patent: *Aug. 21, 2018

(54) EXPANDING INLINE FUNCTION CALLS IN NESTED INLINING SCENARIOS

(71) Applicant: International Business Machines Corporation, Armonk, NY (US)

(72) Inventors: Andrew J. Craik, North York (CA); Rachel E. Craik, North York (CA); Patrick R. Doyle, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/245,241

(22) Filed: Aug. 24, 2016

(65) Prior Publication Data

US 2017/0153877 A1    Jun. 1, 2017

Related U.S. Application Data

(63) Continuation of application No. 14/955,387, filed on Dec. 1, 2015.

(51) Int. Cl.
*G06F 9/45* (2006.01)
*G06F 8/41* (2018.01)

(52) U.S. Cl.
CPC .................... *G06F 8/443* (2013.01)

(58) Field of Classification Search
CPC .................................................. G06F 8/4443
USPC ...................................................... 717/151
See application file for complete search history.

(56) References Cited

U.S. PATENT DOCUMENTS 5,740,443 A * 4/1998 Carini ................ G06F 8/4441
717/133
5,920,723 A    7/1999 Peyton, Jr. et al.
6,072,951 A * 6/2000 Donovan ............... G06F 8/4443
717/158

(Continued)

OTHER PUBLICATIONS

Andersson, "Evaluation of Inlining Heuristics in Industrial Strength Compilers for Embedded Systems", Uppsala Universitet, Feb. 2009, pp. 1-32, <http://www.diva-portal.org/smash/get/diva2:212021/FULLTEXT01.pdf>.
Chang et al., "Profile-Guided Automatic Inline Expansion for C Programs", 1992 Software Practice and Experience, John-Wiley, pp. 1-31, <http://web.eecs.umich.edu/~mahlke/papers/1992/chang_spe92.pdf>.

(Continued)

*Primary Examiner* — Francisco Aponte
(74) *Attorney, Agent, or Firm* — William H. Hartwell

(57) ABSTRACT

A method for expanding inline function calls in inlining scenarios includes receiving an ordered list of inlining options for a computer program and a relational data structure representing dependencies between the inlining options, wherein each inlining option includes an associated cost value and an associated benefit value. A maximum-benefit inlining plan for a selected inlining option of the ordered list is then determined, wherein the maximum-benefit inlining plan includes a set of inlining options from the ordered list that provide a maximum combined benefit value for a combined cost value that is equal to or less than a maximum cost budget, subject to the following conditions: each inlining option of the set precedes, or is, the selected inlining option in the ordered list, and for each inlining option of the set, the set also includes each inlining option that the respective inlining option is dependent on.

17 Claims, 10 Drawing Sheets

(56) References Cited

U.S. PATENT DOCUMENTS

| | | | |
|---|---|---|---|
| 6,195,793 | B1 | 2/2001 | Schmidt et al. |
| 6,449,747 | B2 | 9/2002 | Wuytack et al. |
| 6,971,091 | B1 | 11/2005 | Arnold |
| 6,983,459 | B1 | 1/2006 | Prosser et al. |
| 7,266,813 | B2 | 9/2007 | Nistler et al. |
| 7,302,679 | B2 | 11/2007 | Chakrabarti |
| 7,340,732 | B2 | 3/2008 | Gu |
| 7,360,207 | B2 | 4/2008 | Fahs et al. |
| 7,386,686 | B2 | 6/2008 | Wu et al. |
| 7,496,907 | B2 | 2/2009 | Hind et al. |
| 7,529,112 | B2 | 5/2009 | Dreps et al. |
| 7,646,649 | B2 | 1/2010 | Hazelzet et al. |
| 7,996,825 | B2 | 8/2011 | Chakrabarti et al. |
| 8,356,291 | B2 | 1/2013 | Hind |
| 8,423,980 | B1 | 4/2013 | Ramasamy et al. |
| 8,621,449 | B2 | 12/2013 | Hind |
| 8,701,097 | B2 | 4/2014 | Doyle |
| 8,769,511 | B2 * | 7/2014 | Gal .................... G06F 8/52 717/148 |
| 8,782,623 | B2 * | 7/2014 | Inglis ............. G06F 11/3644 717/148 |
| 8,819,653 | B2 * | 8/2014 | Turner ................ G06F 8/443 717/140 |
| 8,887,140 | B2 | 11/2014 | Lerouge et al. |
| 9,009,691 | B1 | 4/2015 | Chen et al. |
| 9,235,390 | B1 * | 1/2016 | Satish ................ G06F 8/443 |
| 9,244,666 | B2 | 1/2016 | Nakaike et al. |
| 9,304,748 | B2 | 4/2016 | Vick |
| 2005/0044538 | A1 * | 2/2005 | Mantripragada ....... G06F 8/443 717/151 |
| 2011/0067018 | A1 | 3/2011 | Kawachiya et al. |

OTHER PUBLICATIONS

Lee et al., "Aggressive Function Splitting for Partial Inlining", Interact-15: 15th Workshop on Interaction between Compilers and Computer Architectures, Feb. 12, 2011, San Antonio, Texas, USA, Held in conjunction with HPCA 2011 <http://www.cs.fsu.edu/~xyuan/Interact-15/papers/paper11.pdf>.

Martello et al., "Dynamic Programming and Strong Bounds for the 0-1 Knapsack Problem", Management Science, vol. 45, No. 3, Mar. 1999, pp. 414-424, <http://www.iro.umontreal.ca/~gendron/IFT6551/Articles/MartelloPisinger1999.pdf>.

Papadopoulos et al., "Function Inlining in Modelica Models", 7th Vienna International Conference on Mathematical Modelling Feb. 15-17 2012, Vienna University of Technology AGESIM Report No. S38. Mathmod Vienna, <http://seth.asc.tuwien.ac.at/proc12/full_paper/Contribution422.pdf>.

Appendix P List of IBM Patents or Applications Treated As Related. dated Aug. 23, 2016. Two pages.

Original U.S. Appl. No. 14/955,387, filed Dec. 1, 2015.

Zhao et al. "Function Outlining and Partial Inlining". IBM Toronto Laboratory, Markham, ON, CA. Proceedings of the 17th International Symposium on Computer architecture and High Performance Computing (SBAC-PAD '05). 2005 IEEE.

Ayers, et al. "Aggressive Inlining". Hewlett Packard, Massachusetts Language Laboratory-Chelmsford, MA-PLDI '97 Las Vegas, NV, USA. pp. 137-145.

Steiner et al. "Adaptive Inlining and On-Stack Replacement in the CACAO Virtual Machine"—Technische Universitaet Wien Institut fuer Computersprachen Argentinierstr; Wien, Austria-PPPJ 2007, Sep. 5-7, 2007, Lisboa, Portugal. pp. 221-226.

* cited by examiner

```
    for (budget in 1 ... max_budget + 1):
        table[0][budget] = preorder_items[0].cost <= budget ? [ preorder_items[0] ] : [ ]
    endfor                          ⸻ 302
    for (row in 1 ... preorder_items.size):
        for (budget in 1 ... max_budget + 1):    ⸻ 304
            curr_item = preorder_items[row]
            curr_set = [ curr_item ]
            if (curr_set.cost >= budget)
                goto keep_previous
            prev_best = table[row - 1][budget - current_set.cost]
306 ⸺  while (curr_item.parent != NULL &&
                   curr_item.parent NOT IN prev_best):
                curr_set = curr_set + curr_item.parent
                if (curr_set.cost >= budget)
                    goto keep_previous
                curr_item = curr_item.parent
                prev_best = table[row - 1][budget - curr_set.cost]
            end while
            new_proposal = prev_best + curr_set
308 ⸺  if (table[row - 1][budget].benefit < new_proposal.benefit):
                table[row][budget] = new_proposal
            else:
        keep_previous:
                table[row][budget] = table[row - 1][budget]
        endfor
    endfor
```

FIG. 3

| IDT node | 1 | 2 | 3 | 4 | 5 |
|---|---|---|---|---|---|
| a | {a} | {a} | {a} | {a} | {a} |
| b | {a} | {ab} | {ab} | {ab} | {ab} |
| d | {a} | {ab} | {abd} | {abd} | {abd} |
| c | {a} | {ab} | {abd} | {abdc} | {abdc} |
| e | {a} | {ab} | {ace} | {abce} | {abcde} |
| f | {a} | {ab} | {ace} | {abce} | {abcde} |

```
for (budget in 1 ... max_budget + 1):
    table[0][budget] = items_by_cost [0].cost <= budget ? [ items_by_cost [0] ] : [ ]
endfor
                                    /——702
for (row in 1 ... items_by_cost.size):
    for (budget in 1 ... max_budget + 1):        —304
        curr_item = items_by_cost[row]
        curr_set = [ curr_item ]
        if (curr_set.cost >= budget)
            goto keep_previous
        hx_row = row - 1
306 —— while (curr_item.parent != NULL &&
              curr_item.parent NOT IN table[hx_row][budget - current_set.cost]):
            curr_set = curr_set + curr_item.parent
            if (curr_set.cost >= budget)
                goto keep_previous
            curr_item = curr_item.parent
        end while
704 —— while (curr_set INTERSECTS table[hx_row][budget - curr_set.cost] ||
              curr_item.parent NOT IN table[hx_row][budget - curr_set.cost]):
            hx_row -= 1
        end while
        new_proposal = table[hx_row][budget - curr_set.cost] + curr_set
308 —— if (table[row - 1][budget].benefit < new_proposal.benefit):
            table[row][budget] = new_proposal
        else:
    keep_previous:
            table[row][budget] = table[row - 1][budget]
    endfor
endfor
```

FIG. 7

EXPANDING INLINE FUNCTION CALLS IN NESTED INLINING SCENARIOS

BACKGROUND

The present invention relates generally to the field of compilers, and more particularly to expanding inline function calls in nested inlining scenarios.

Inline function expansion, or inlining, is a compiler optimization that replaces a function call with the body of the function being called, thereby eliminating the cost of the call-return sequence. Many object oriented programs, such as Java, generally contain a large number of small methods, like getter and setter methods, and so inlining is a very important technique to improve application performance. Inlining allows the compiler to aggregate numerous small methods into larger units which are more amenable to other compiler optimization techniques and removes the function call overheads associated with multiple calls to many small functions.

SUMMARY

Embodiments of the present invention disclose a method, computer program product, and system for expanding inline function calls in inlining scenarios. The method includes receiving an ordered list of inlining options for a computer program and a relational data structure representing dependencies between the inlining options, wherein each inlining option includes an associated cost value and an associated benefit value. A maximum-benefit inlining plan for a selected inlining option of the ordered list is then determined, wherein the maximum-benefit inlining plan includes a set of inlining options from the ordered list that provide a maximum combined benefit value for a combined cost value that is equal to or less than a maximum cost budget, subject to the following conditions: each inlining option of the set precedes, or is, the selected inlining option in the ordered list, and for each inlining option of the set, the set also includes each inlining option that the respective inlining option is dependent on, as represented by the relational data structure.

BRIEF DESCRIPTION OF THE DRAWINGS

FIG. 3 is an example of a simple modified dynamic programming algorithm that produces optimal solutions for nested inlining, in an embodiment in accordance with the present invention.

FIG. 7 is an example of an updated modified dynamic programming algorithm that produces optimal solutions for nested inlining by introducing a constraint on the order in which nodes need to be considered and is capable of backtracking across many levels of decision making, in an embodiment in accordance with the present invention.

DETAILED DESCRIPTION

Certain embodiments in accordance with the present invention include an inlining algorithm that operates on a fixed cost budget and seeks to maximize the benefit that may be obtained for the fixed cost budget from a given universe of potential inlining decisions. The algorithm operates on an abstract representation of a program's inter-procedural control flow, referred to as the inlining dependency tree (IDT). An IDT is an abstract representation of an interprocedural control flow for a respective program. Stated another way, an IDT is an ordered list of inline function options for a computer program. In the IDT, each node represents one inlining option for a program function or method, and directed edges represent the dependencies between inlining options. In the absence of partial inlining, an IDT node corresponds to one call-site/callee-method pair. In programming, a call-site of a function or subroutine is the location (e.g., the line of code) where the function is called, or may be called through dynamic dispatch. In other words, a call site is where either zero or one or more arguments are passed to the function, and either zero or more return values are received. A callee-method is also referred to as a subroutine. In computer programming, a subroutine is a sequence of program instructions that perform a specific task that can be used in programs wherever that particular task should be performed. A method with one polymorphic call-site looks very much like a method with multiple monomorphic call sites in this model; the difference would be represented by the polymorphic IDT nodes having slightly higher costs to account for any virtual guard code. In computer programming, a polymorphic call-site is a call-site that may cause one of a set of different subroutines to be executed based on the types of data supplied as arguments, whereas a monomorphic call-site has only one target subroutine—the method run does not vary based on the types of data supplied as arguments. The IDT can be produced from any program abstraction which preserves call-site/callee-method information. In practice the IDT may be produced using a low cost scan of the input program.

Figure 1:
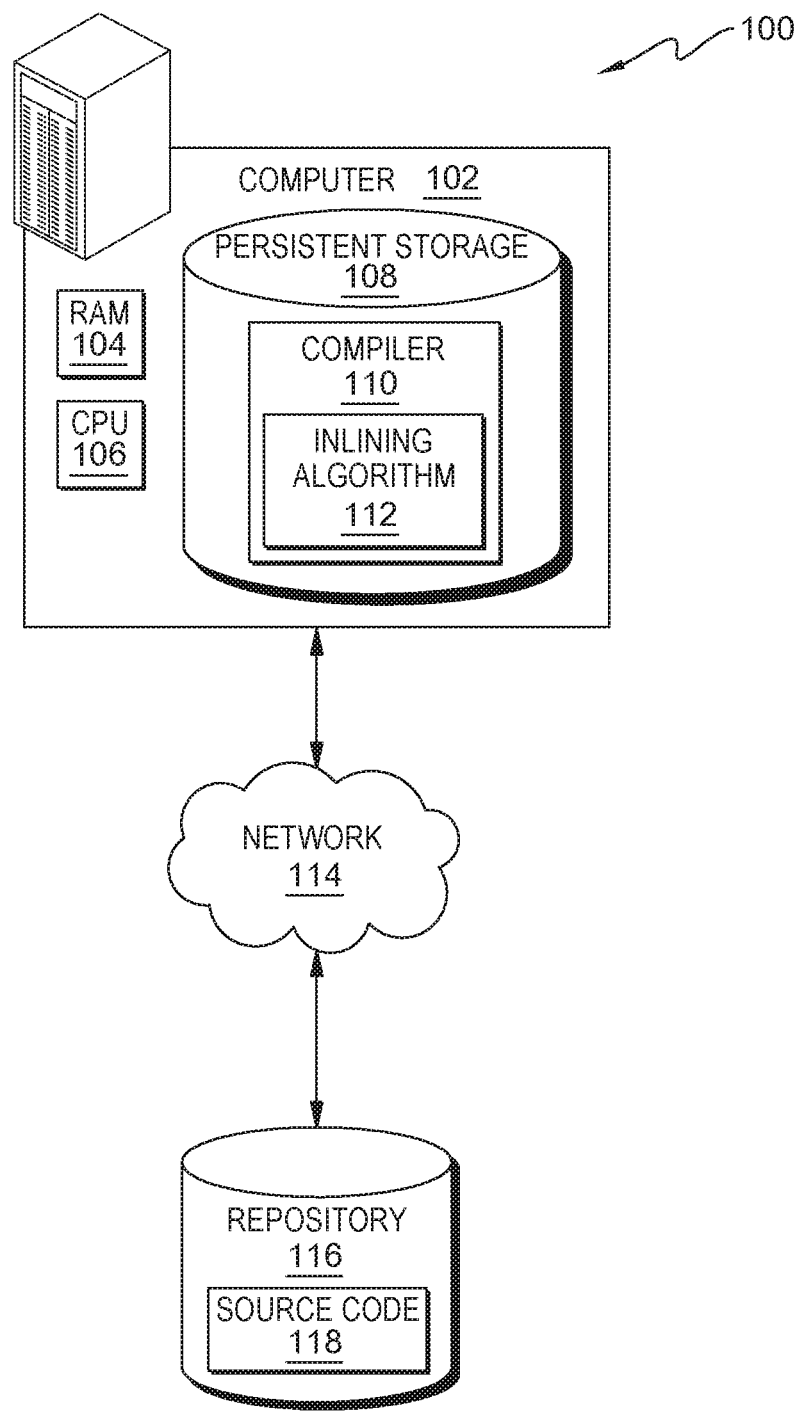
FIG. 1 is a functional block diagram illustrating a compiler data processing environment, in an embodiment in accordance with the present invention.

Embodiments in accordance with the present invention will now be described in detail with reference to the Figures. FIG. 1 is a functional block diagram, generally designated 100, illustrating a compiler data processing environment, in an embodiment in accordance with the present invention.

Compiler data processing environment 100 includes computer 102 and repository 116, also referred to as source code repository 116, interconnected over data connection network 114. Computer 102 includes random access memory (RAM) 104, central processing unit (CPU) 106, and persistent storage 108. Computer 102 may be a Web server, or any other electronic device or computing system, capable of processing program instructions and receiving and sending data. In some embodiments, computer 102 may be a laptop computer, a tablet computer, a netbook computer, a personal computer (PC), a desktop computer, a personal digital assistant (PDA), a smart phone, or any programmable electronic device capable of communicating over data connection network 114. In other embodiments, computer 102 may represent server computing systems utilizing multiple computers as a server system, such as in a distributed computing environment. In general, computer 102 is representative of any electronic devices or combinations of electronic devices capable of executing machine-readable program instructions and communicating with source code repository 116 via network 114 and with various components and devices within compiler data processing environment 100.

Computer 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Compiler 110 is stored in persistent storage 108, which also includes operating system software as well as software that enables computer 102 to communicate with source code repository 116, as well as other computing devices (not shown) of compiler data processing environment 100 over data connection network 114.

Compiler 110 is stored in persistent storage 108. Compiler 110 is a computer program, or a set of programs, that transforms source code written in a programming language (i.e., the source language) into another computer language (i.e., the target language), with the latter often having a binary form known as object code. The most common reason for converting a source code is to create an executable program. Inlining algorithm 112 is contained in compiler 110 and enables compiler 110 to efficiently produce an optimal, or best, inlining plan for source code 118 in repository 116, even in the presence of nested inlining, that maximizes the benefit of inlining obtained for a given cost budget.

The factors by which an inlining plan may be considered optimal, or best, may vary between embodiments. For example, in certain embodiments, an optimal inlining plan is a plan that maximizes the benefits provided by the code. In other embodiments, an optimal inlining plan is a plan that minimizes the cost of the code. In still other embodiments, an optimal inlining plan is a plan that considers both the cost of the code and the benefits provided by the code. None of these examples are meant to be limiting, however, and an inlining plan may be considered optimal, or best, based on a wide variety of available factors, as will be discussed in further detail below.

In FIG. 1, network 114 is shown as the interconnecting fabric between computer 102 and source code repository 116 to enable compiler 110 and inlining algorithm 112 to determine optimal solutions for nested inlining scenarios. In practice, network 114 may be any viable data transport mechanism. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between computer 102 and source code repository 116 in accordance with an embodiment of the invention.

Source code repository 116 is included in compiler data processing environment 100. Source code repository 116 is used as a revision control system, also referred to as version control or source control, that manages changes to documents, computer programs, large web sites, and other collections of information (e.g., source code 118). In some embodiments, changes are identified by a number or letter code, termed the "revision number," "revision level," or simply "revision." For example, an initial set of files is "revision 1." When the first change is made, the resulting set is "revision 2," and so on. Each revision is associated with a timestamp and the person making the change. Revisions may be compared, restored, and with some types of files, merged. In other embodiments, source code repository 116 may be a directory of files without a revision control system of any kind.

Repository 116 includes source code 118, also referred to as a code base. In software development, a code base refers to a whole collection of source code that is used to build a particular software system, application, or software component. Typically, a code base includes only human-written source code files and generally does include configuration and property files necessary for the build. In an example embodiment, source code 118 is the target source to be analyzed by compiler 110 using inlining algorithm 112. In another example embodiment, more than one source code repository 116 and/or source code 118 (e.g., code base) may be identified as the target source.

Figure 10:
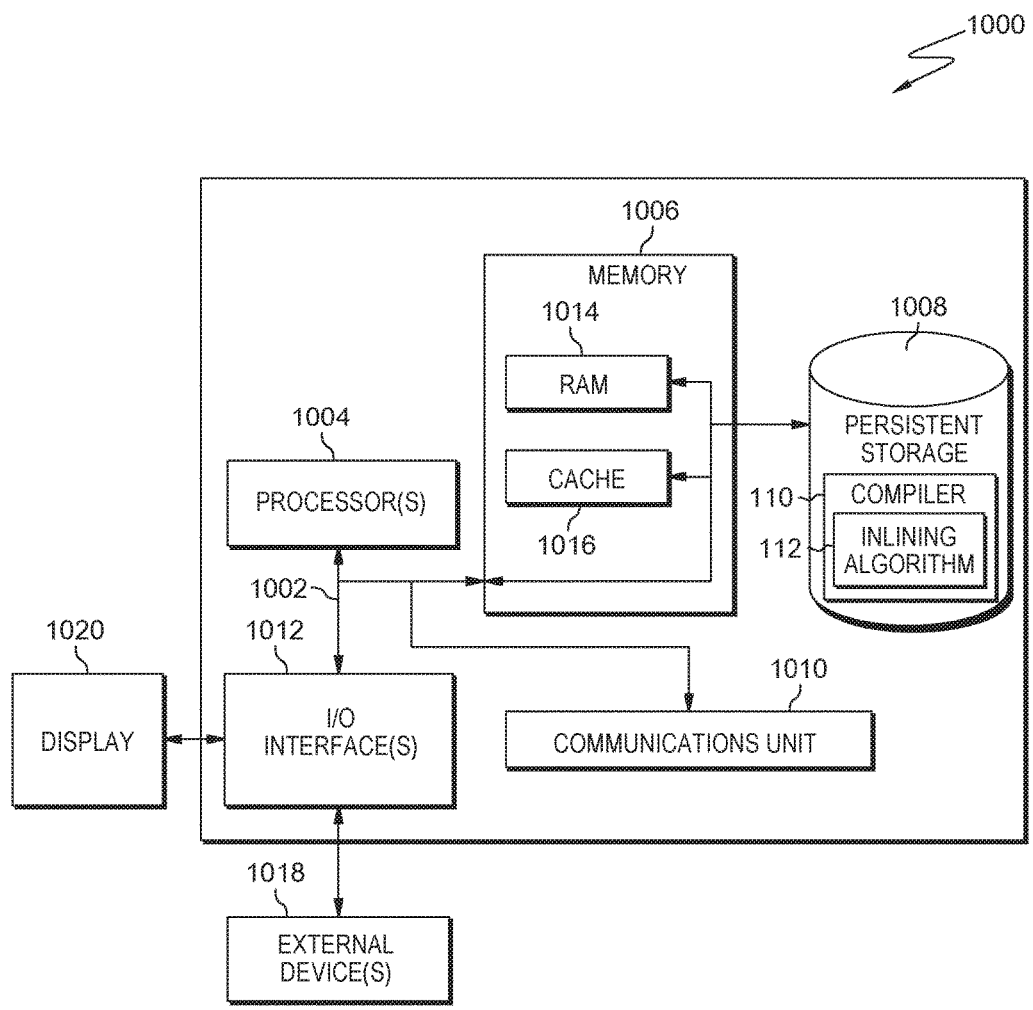
FIG. 10 depicts a block diagram of components of a computer executing a modified dynamic programming algorithm, in an embodiment in accordance with the present invention.

Computer 102 may include internal and external hardware components, as depicted and described in further detail with respect to FIG. 10.

Figure 2:
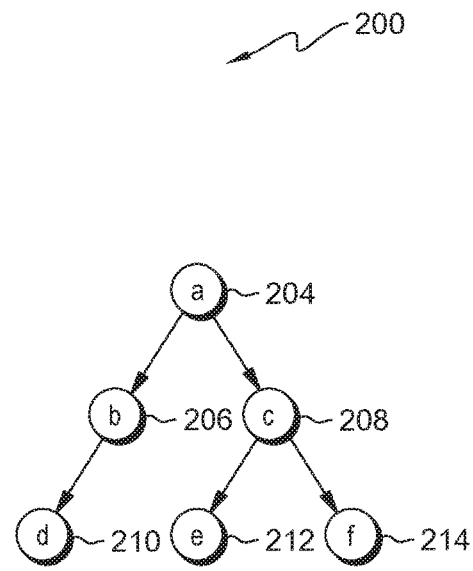
FIG. 2 is a functional block diagram of an inlining dependency tree and an associated code snippet and table, within the compiler data processing environment of FIG. 1, where each node of the tree represents one inlining option, and directed edges represent the dependencies between the inlining options, in an embodiment in accordance with the present invention.

FIG. 2 is a functional block diagram, generally designated 200, of an inlining dependency tree within the compiler data processing environment of FIG. 1, where each node represents one inlining option, and directed edges represent the dependencies between the inlining options, in an embodiment in accordance with the present invention. In some example embodiments, the cost and benefit metrics may be computed on a device (not shown) within compiler data processing environment 100. In other example embodiments, the cost and benefit metrics may be computed in compiler 110.

As previously stated, the IDT may be produced from any program abstraction that preserves the call-site/callee-method information. In the IDT, each node represents one inlining option for a program function or method, and directed edges represent the dependencies between inlining options as depicted in FIG. 2. In the absence of partial inlining, an IDT node corresponds to one call-site/callee-method pair. Each node in the IDT has an associated cost and benefit metric. One example of a cost metric would be the code size increase caused by the duplication of the inlined code into the call-site. An example of a benefit metric would be the gain of duplicating the inlined code into the call-site. Stated another way, a benefit of inlining code into a function would be not having to make the call to the function and having to return once the function completes. As shown in FIG. 2, node "a" 204 is the first node in the IDT and the code corresponding to node "a" 204 includes call-sites for the code corresponding to node "b" 206 and node "c" 208 (as indicated by their corresponding relationships in the IDT). Node "a" 204, node "b" 206 and node "c" 208 all have a cost metric of 1 and a benefit metric of 1 as depicted in example code snippet 202. The code corresponding to node "b" 206 includes a call-site for code corresponding to node "d" 210 that has a cost metric of 1 and a benefit metric of 5 as depicted in 202. The code corresponding to node "c" 208 includes call-sites for the code corresponding to node "e" 212 and node "f" 214. Node "e" 212 has a cost metric of 1 and a benefit metric of 7. Node "f" 214 has a cost metric of 1 and a benefit metric of 1, as depicted in 202.

The algorithm described in the present invention takes these metrics as inputs, and the actual performance of the resulting code depends on the accuracy of these metrics. In this embodiment, for the sake of concreteness, the benefit metrics are considered to be proportional to the size of each function's code, and the costs can all be equal to 1, however neither assumption is necessary for the operation of the algorithm. In other example embodiments, the algorithm described in the present invention may also cope with methods having negative benefit ratings or metrics, and with non-positive costs in limited circumstances (e.g., such as leaf methods). In the presence of recursion, the IDT may become theoretically infinite as the recursive call sequence may be inlined into itself infinitely many times. In practice, due to a fixed cost budget and positive node costs, the IDT may be pruned once the inline expansions exceed the cost budget, making the tree finite in practice.

The algorithm works like any dynamic programming algorithm insofar as it involves filling in a table in a particular order as depicted by table 218 in FIG. 2. In this example embodiment, table 218 has a column for each possible cost budget up to the user's specified cost budget (b), and a row for each IDT node. The rows are ordered such that all of a node's predecessors precede it in table 218. In the example embodiment of FIG. 2, the maximum cost budget is 5.

The objective of the algorithm is to supply, for each table cell, the highest-benefit inlining plan (i.e., a set of IDT nodes) subject to two constraints: (1) the plan must contain no nodes represented by subsequent rows, and (2) the plan's cost must not exceed the cost budget for the cell's column. However, the dependency between the IDT nodes leads to a third constraint that only valid plans are permitted: a node may only be present in a plan if all its predecessors in the IDT are also present. This additional constraint renders existing dynamic programming algorithms either sub-optimal, inefficient, or incorrect. Existing algorithms cannot solve this problem in a time proportional to the number of cells in the table.

FIG. 3 is an example of a simple modified dynamic programming algorithm, generally designated 300, that produces optimal solutions for nested inlining, in an embodiment in accordance with the present invention. FIG. 3 shows a simple modified dynamic programming algorithm, also referred to as an augmented dynamic programming algorithm, that produces optimal solutions with only slightly higher cost than current dynamic programming solutions to the single level inlining problem. The input to the algorithm is a list of functions to process in a preorder over the IDT (i.e., preorder_items 302) and a budget (i.e., max_budget 304). It is important to note that loop 306 is an important part of inlining algorithm 112 as an improvement over current dynamic programming algorithms in that inlining algorithm 112 allows backtracking by incrementally considering a node and its predecessor(s) as a single unit. Inlining algorithm 112 populates table 218 and the inlining solution for a given set of nodes and cost budget can be read from the table. The best inlining solution for the nodes and budget supplied to the algorithm is found in the last row in the cell corresponding to the user specified cost budget that is saved into table 218 as depicted in if else 308.

Figure 4:
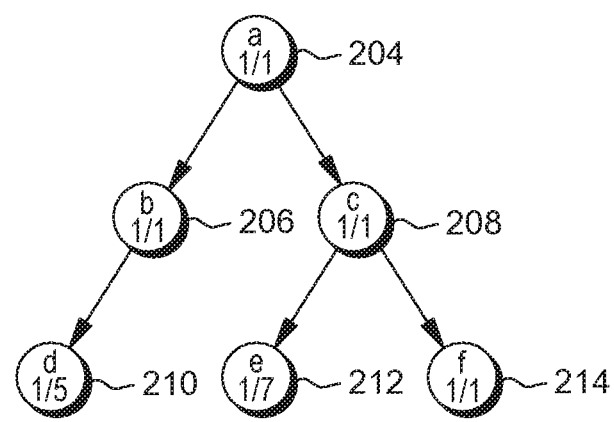
FIG. 4 is a functional block diagram of a table and an associated inlining dependency tree within the compiler data processing environment of FIG. 1, where each column of the table represents a possible cost budget up to a user's specified cost budget and a row for each inlining dependency tree node, in an embodiment in accordance with the present invention.

FIG. 4 is a table, generally designated 218, and an associated inlining dependency tree, generally designated 400, within the compiler data processing environment of FIG. 1, where each column represents a possible cost budget up to a user's specified cost budget and a row for each inlining dependency tree node, in an embodiment in accordance with the present invention. Continuing with the example embodiment of FIG. 2, the IDT is shown with the cost and benefit metrics for each node as depicted in nodes 204 through 214. Using the IDT in FIG. 4, with the cost and benefit metrics for each node, compiler 110 uses inlining algorithm 112 to build table 218 with rows a, b, d, c, e, f and a cost budget of 5. One rule the preorder walk uses when building table 218 is that every node must be named before any child nodes. Stated another way, node "b" 208 cannot appear before node "a" 204. Using this rule, compiler 110, using inlining algorithm 112, considers the IDT nodes starting with node "a" 204. The first node in the IDT that is called by node "a" 204 is node "b" 206. The code corresponding to node "b" 206 includes a call-site for the code corresponding to node "d" 210. The next node in the IDT that is called by node "a" 204 is node "c" 208. The code corresponding to Node "c" 208 includes call-sites for the code corresponding to node "e" 212 and node "f" 214. The IDT node row headings are then assigned the node order determined in the preorder walk. This is important because a node may only be added to a previous solution that includes all of the nodes predecessors in the IDT. The columns are the possible budgets up to the maximum budget.

When considering node "a" 204 as a possible inlining solution with a budget of 1, the only option is node "a" 204, also referred to as node "a". The same is true for all budgets for node "a" 204, regardless of the benefit, as in this case there are no other options, as depicted by table 218 in FIG. 4. When considering node "b" 206 as a possible inlining solution for a budget of 1, the result is that the only possible inlining solution is node "a". Node "b" 206, also referred to as node "b", is not an option because node "b" is dependent on node "a" and would need to be included, and is therefore not possible with a cost budget of 1. When considering node "b" as a possible inlining solution, with a budget of 2, node "b" is now possible, therefore nodes "a" and "b", also referred to as nodes "ab", are an option. This is also true for all budgets greater than 1 for node "b" 206 as depicted in table 218. Nodes "ab" have a combined benefit of 2, and therefore is a better solution than the previous solution of just node "a". When considering node "d" 210, also referred to as node "d", and a cost budget of 1, node "d" and node "b" are not options since the cost budget is 1. However, with a cost budget of 3 or more, nodes "abd" are an option because node "d" is dependent on node "b" and node "b" is dependent on node "a" as depicted in table 218. Nodes "abd" provide a benefit of 7. The next node in the IDT that is dependent on node "a" is node "c" 208, also referred to as node "c". When considering node "c" as a possible inlining solution with a cost budget of 1, node "c" and node "b" are not options. When the cost budget is 2, nodes "ab" and "ac" are now options, however the previous solution, nodes "ab" are chosen because the new solution of nodes "ac" does not have a higher combined benefit. The same holds true for a cost budget of 3 as depicted in table 218 at row "c" and a cost budget of 3. With a cost budget of 4 or 5, nodes "abdc" are now considered and provide a benefit of 8. When considering node "e" 212 as a possible inlining solution with a cost budget of 1, the only option again, is node "a". With a cost budget of 2, node "e" is not possible because the total cost of inlining all of the predecessors of node "e" exceeds the budget. With a cost budget of 3, nodes "ace" are now an option because node "e" 212, also referred to as node "e", is dependent on node "c" and node "c" is dependent on node "a", and the combined cost of all three nodes is 3. Node "ace" has a combined benefit of 9. It is important to note this particular inlining plan for node "e" because current compiler optimization techniques would not determine this option. Node "e" cannot be directly added to the previous solutions and so inlining algorithm 112 considers nodes "ce" for addition. Nodes "ace" have a higher benefit than nodes "abd" and are an example of how inlining algorithm 112 effectively allows backtracking by undoing the decision to include node "b" and switch to including node "c" when a better inlining option becomes available.

With a cost budget of 4, nodes "abce" are now an option and have a combined benefit of 10, and with a cost budget of 5, nodes "abcde" are an option and have a combined benefit of 15. When considering node "f" 214, also referred to as node "f", and a cost budget of 1, the only option is node "a". With a cost budget of 2, node "b" is now possible, therefore nodes "ab" are an option. With a cost budget of 3, nodes "ace" are now an option because node "e" 212, also referred to as node "e", is dependent on node "c" and node "c" is dependent on node "a". With a cost budget of 4, nodes "abce" are now an option, and with a cost budget of 5, nodes "abcde" are an option and have a combined benefit of 15. In the example embodiment of FIG. 4, the optimal solution for the given IDT, for a budget of 5, is "abcde".

Figure 5:
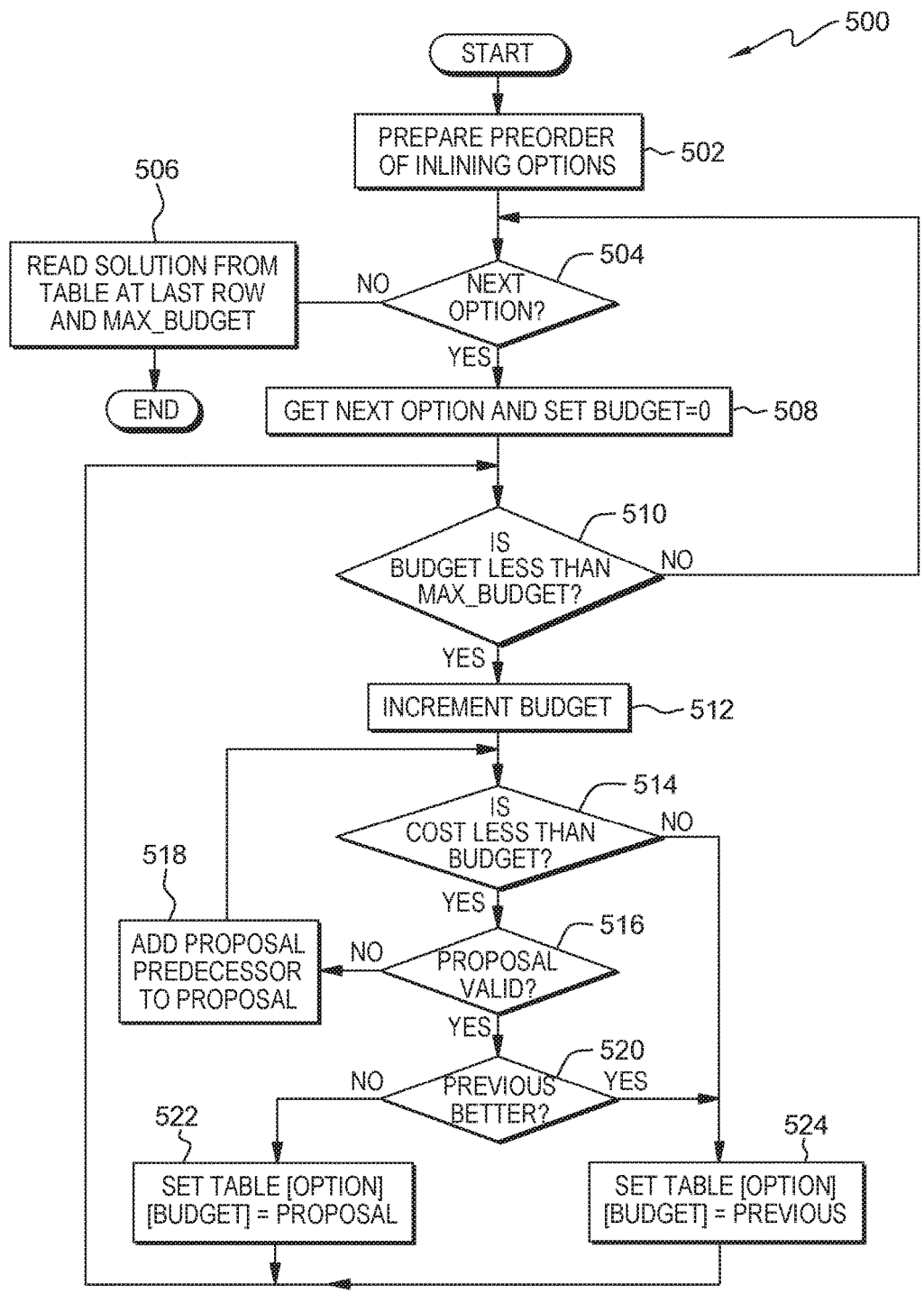
FIG. 5 is a flowchart depicting operational steps of a simple modified dynamic programming algorithm, on a computer within the compiler data processing environment of FIG. 1, for efficiently producing an optimal inlining plan, in an embodiment in accordance with the present invention.

FIG. 5 is a flowchart, generally designated 500, depicting operational steps of a simple modified dynamic programming algorithm, on a computer within the compiler data processing environment of FIG. 1, for efficiently producing an optimal inlining plan, in an embodiment in accordance with the present invention. Inlining algorithm 112, receives a preorder of inlining options to determine the optimal solution for an IDT based on a determined maximum cost budget as depicted in step 502. For example, compiler 110 and/or inlining algorithm 112 retrieves the externally calculated IDT that contains the associated cost and benefit metric for each node. In another example embodiment, the IDT may be calculated on computer 102, or by compiler 110 and/or inlining algorithm 112. Compiler 110 then creates a table to contain the highest benefit inlining plan for a set of IDT nodes.

In decision step 504, inlining algorithm 112 determines if there is an inlining option remaining to be considered. Using the example from FIG. 4, the first inlining option, also referred to as a node, to consider would be node "a". If there is a next decision in the IDT ("Yes" branch, decision 504), inlining algorithm 112, retrieves the next option from the IDT and sets the budget equal to zero as depicted in step 508. For example, inlining algorithm 112 retrieves node "a" 204.

In decision step 510, inlining algorithm 112 determines if the budget is less than the maximum defined budget for the inlining plan. If inlining algorithm 112 determines that the budget is not less than the maximum defined budget for the inlining plan ("No" branch, decision 510), inlining algorithm 112 determines if there is a next option in the inlining plan as depicted in decision step 504. If inlining algorithm 112 determines that the budget is less than the maximum defined budget for the inlining plan ("Yes" branch, decision 510), inlining algorithm 112 increments the budget for the option as depicted in step 512.

In decision step 514, inlining algorithm 112 determines if the cost of the node is less than the budget for the inlining plan. For example, node "a" was determined to have an associated cost of 1 and a benefit of 1 as depicted in the IDT in FIG. 4. As discussed in FIG. 4, when considering node "a", the only option is node "a" for all budgets because node "a" is not dependent on any other nodes. Inlining algorithm 112 determines if the associated cost of node "a" is less than the budget of 5. If inlining algorithm 112 determines that the associated cost of the node is not less than the budget ("No" branch, decision 514), inlining algorithm 112 copies the previous best solution, if any, as depicted in step 524 and then determines if the budget for the current column in table 218 is less than the maximum defined budget for the inlining plan as depicted in decision step 510. If inlining algorithm 112 determines that the associated cost of the node is less than the budget ("Yes" branch, decision 514), inlining algorithm 112 determines if the proposal is valid as depicted in decision step 516.

In decision step 516, inlining algorithm 112 determines if the current proposal is valid. Using, for example, node "e" with a cost budget of 3 as discussed in FIG. 4, inlining algorithm 112 determines that the optimal solution is "ace". Compiler 110 and inlining algorithm 112 does this by first determining if the proposal is valid by ensuring all ancestor nodes are included in the solution. For example, if the proposal was "abe", inlining algorithm 112 would determine it would be invalid because a node may only be present in the plan if all of the nodes that are predecessors to that node in the IDT are also present. Another example would be considering node "b" with a cost budget of 2. Inlining algorithm 112 can only choose nodes "ab" because together they have a cost of 2, and node "b" is dependent on node "a". If compiler 110 and inlining algorithm 112 determine that the current proposal is not valid ("No" branch, decision 516), inlining algorithm 112 adds the immediate predecessor to the proposal to produce nodes "ab" and repeats decision step 514 as depicted in step 518. For example, while considering node "e" for a cost budget of 3 where inlining algorithm 112 suggests using nodes "abe", inlining algorithm 112 would determine this proposal to be invalid because the proposed solution "abe" violates the rule of a node's predecessors being present in the solution. If compiler 110 and inlining algorithm 112 determine that the current proposal is valid ("Yes" branch, decision 516), inlining algorithm 112 then determines if the previous proposal is better, or more optimal, as depicted in decision step 520. For example, while considering node "e" for a cost budget of 3 where inlining algorithm 112 suggests using nodes "ace", inlining algorithm 112 will then examine the previous proposal of "abd" to determine if "abd" is better. Nodes "ace" are found to be a valid solution and to have a combined benefit of 9.

In decision step 520, inlining algorithm 112 determines if the previous proposal is better than the current proposal. Referring again to the previous example, where using node "e" with a cost budget of 3 and the optimal solution of "ace"; compiler 110 and inlining algorithm 112 compare the current solution of "ace" with the previous solution "abd" to determine which solution has the higher benefit. If compiler 110 and inlining algorithm 112 determine that the previous solution "abd" is not better than the current solution "ace" ("No" branch, decision 520), compiler 110 and inlining algorithm 112 sets the current solution "ace" in table 218 for the node at the indicated budget as depicted step 522, and then determines if the budget for the current column in table 218 is less than the maximum defined budget for the inlining plan as depicted in decision step 510. If compiler 110 and inlining algorithm 112 determine that the previous solution is better than the current solution ("Yes" branch, decision 520), compiler 110 and inlining algorithm 112 sets the previous solution in table 218 for the node at the indicated budget as depicted step 524, and then determines if the budget for the current column in table 218 is less than the maximum defined budget for the inlining plan as depicted in decision step 510.

If there is no next decision in the IDT ("No" branch, decision 504), inlining algorithm 112 reads the solution from table 218 as depicted in step 506. The best solution is contained in table 218, of FIG. 4, in the last row in the column for the maximum budget (i.e., max_budget), as depicted in FIG. 3. For the example embodiment of FIG. 4, the optimal solution for the IDT for a maximum budget of 5, is "abcde". Upon determining the optimal solution for the IDT, inlining algorithm 112 may perform inline function expansion for the computer program according to the determined maximum-benefit inlining plan.

Figure 6:
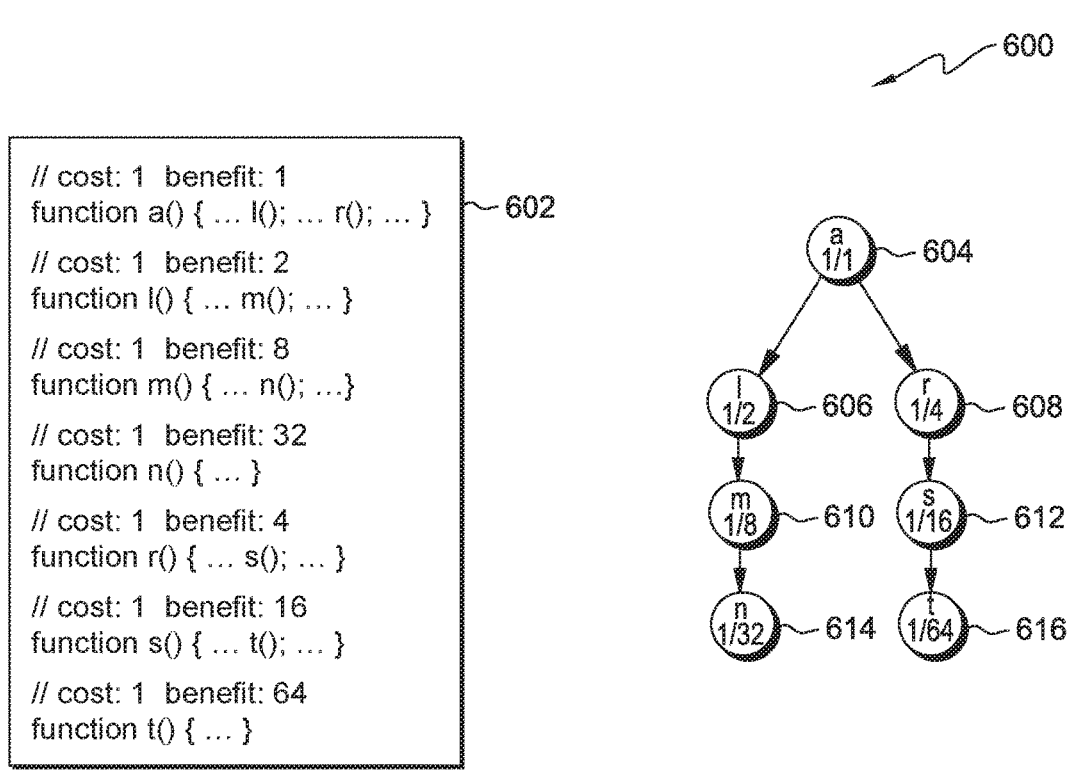
FIG. 6 is a functional block diagram of an inlining dependency tree and an associated code snippet and table, within the compiler data processing environment of FIG. 1, in an embodiment in accordance with the present invention.

FIG. 6 is a functional block diagram, generally designated 600, of an inlining dependency tree within the compiler data processing environment of FIG. 1, in an embodiment in accordance with the present invention. In this example embodiment, inlining algorithm 112 is enhanced to introduce a constraint on the order in which nodes need to be considered. For example, rather than just be considered in a valid preorder, a node must also be considered in order of lowest to highest cumulative benefit, where the cumulative benefit value is the sum of benefits from the root of the tree to the node in question. Inlining algorithm 112 is also extended to add an additional backtracking step that allows for less optimal intermediate solutions to be considered when sub-optimality is detected.

In FIG. 6, the code corresponding to node "a" 604 in the IDT includes call-sites for the code corresponding to node "l" 606 and node "r" 608 as also shown in code snippet 602 (where functions "l" and "r" are called from function "a"). Node "a" 604, also referred to as node "a", has an associated cost of 1 and a benefit of 1. Node "l" 606, also referred to as node "l", has an associated cost of 1 and a benefit of 2. Node "r" 608, also referred to as node "r" has an associated cost of 1 and a benefit of 4. The code corresponding to node "l" includes call-sites for the code corresponding to node "m" 610, also referred to as node "m", that has an associated cost of 1 and a benefit of 8. The code corresponding to node "m" includes call-sites for the code corresponding to node "n" 614, also referred to as node "n", that has an associated cost of 1 and a benefit of 32. Continuing with the include chain for node "a", the code corresponding to node "r" includes call-sites for the code corresponding to node "s" 612, also referred to as node "s", that has an associated cost of 1 and a benefit of 16. The code corresponding to Node "s" includes call-sites for the code corresponding to node "t" 616, also referred to as node "t", that has an associated cost of 1 and a benefit of 64.

In the example embodiment of FIG. 6, the dynamic programming algorithm described in the example embodiment of FIGS. 2-5 may, depending on the preorder traversal selected, consider node "r" before node "l" and produce no intermediate solutions containing node "l", possibly resulting in a non-optimal solution. For example, if the IDT nodes were considered in the order "a", "r", "l", "m", "s", "n", "t", the dynamic programming algorithm described in the example embodiment of FIGS. 2-5 would produce "arst" as the best solution for a cost budget of 5, even though "alrst" is valid and has a higher total benefit.

FIG. 7 is an example of an updated modified dynamic programming algorithm, also referred to as an augmented dynamic programming algorithm, generally designated 700, that produces optimal solutions for nested inlining by introducing a constraint on the order in which nodes need to be considered and is capable of backtracking across many levels of decision making with only slightly higher cost than current dynamic programming solutions, in an embodiment in accordance with the present invention. The input to the algorithm is a list of functions to process in a preorder over the IDT (i.e., items_by_cost 702) and a budget (i.e., max_budget 304). As previously stated in FIG. 3, while loop 306 is an important part of inlining algorithm 112 as an improvement over current dynamic programming algorithms. While loop 306 allows inlining algorithm 112 to ensure the current proposal is valid. However, a second while loop, while loop 704, allows inlining algorithm 112 to determine the optimal solution on the order that nodes need to be considered. Inlining algorithm 112 populates table 218 and the optimal inlining for the given nodes and budget can be read from the last row in the cell corresponding to the user specified cost budget that is saved into table 218 as depicted in if else 308.

Figure 8:
FIG. 8 is a table representing the output of an updated modified dynamic programming algorithm within the compiler data processing environment of FIG. 1, which constrains the order of node consideration and is capable of backtracking across many levels of decision making, in an embodiment in accordance with the present invention.

FIG. 8 is a table, generally designated 800, representing the output of an updated modified dynamic programming algorithm within the compiler data processing environment of FIG. 1, which constrains the order of node consideration and is capable of backtracking across many levels of decision making, in an embodiment in accordance with the present invention. Continuing with the example embodiment of the IDT in FIG. 6, table 802 is shown with the cost and benefit metrics for each node as depicted in nodes 604 through 616. Using the IDT in FIG. 6, with the cost and benefit metrics for each node, compiler 110 uses inlining algorithm 112 to traverse the IDT nodes in a preorder walk to determine rows a, l, r, m, s, n, t using a maximum cost budget of 6 in building table 802. A new constraint of inlining algorithm 112 is the order that nodes need to be considered. Stated another way, rather than just being considered in a valid preorder, the nodes must also be considered in order of lowest to highest cumulative benefit—that is the sum of benefits from the root of the tree to the node in question.

Using this rule, inlining algorithm 112, operating in compiler 110, is supplied the IDT nodes starting with node "a". As previously seen in the example embodiment of FIG. 4, all the nodes in the IDT of FIG. 6 have an associated cost metric of 1. When considering node "a" with a budget of 1, the only option is node "a". The same is true for all budgets for node "a", regardless of the benefit, in this case, since there are no other options as depicted by table 802 in FIG. 8. When considering node "l", for a budget of 1, the result is only node "a", node "l" is not an option because node "l" is dependent on node "a" and would have a combined cost of 2, and is, therefore, not possible with a cost budget of 1. When considering node "l", for a budget of 2, node "l" is now possible, therefore nodes "a" and "l", also referred to as nodes "al", are an option. This is also true for all budgets greater than 1 for node "l" as depicted in table 802. Node "al" has a combined benefit of 3, and therefore is a better solution than the previous solution of just node "a". When considering node "r" and a cost budget of 1, node "r" and node "l" are not options since the cost budget is 1. With a cost budget of 2, node "r" is an option because it is dependent on node "a" and together has a combined benefit of 5. The combined benefit of nodes "ar" is higher than the combined benefit of nodes "al", so nodes "ar" are selected. With a cost budget of 3 or more, nodes "alr" are an option because nodes "l" and "r" are dependent on node "a" as depicted in the IDT of FIG. 6. Nodes "alr" provide a maximum benefit of 7.

When considering node "m" and a cost budget of 1, node "m" is not an option. When the cost budget is 2, nodes "al" and nodes "ar" are the only options, so the previous solution "ar" is selected. However, with a cost budget of 3, nodes "alm" are now an option because node "m" is dependent on node "l" and node "l" is dependent on node "a". With a cost budget of 4, 5 or 6, nodes "alrm" are now considered and provide a maximum benefit of 15. When considering node "m" and looking at row "r" column 2, inlining algorithm 112 may see if node "m" could be added to the previous best solution "ar". However, the solution "ar" is invalid for node "m" because "ar" does not contain the ancestor node "l" for node "m". Inlining algorithm 112, therefore, continues back across row "r" and considers adding "lm" to the solution in row r column 1 to produce "alm". The solution "alm" is a valid choice and so when comparing "alr" with "alm", inlining algorithm 112 may choose "alm". In doing this, inlining algorithm 112 can effectively undo the choice to include "r" in the solution. Existing algorithms—such as knapsack packing algorithms—would have failed at this step (e.g., while loop 306).

The next node in the IDT to consider is node "s". When considering node "s" with a cost budget of 1, the only option is node "a". When the cost budget is 2, nodes "ar" are the best option. For a budget of 3, nodes "ars" are considered to be the best solution. When considering node "s" with a cost budget of 4, inlining algorithm 112 determines that nodes "alrs" is the optimal solution. It is important to note an event which occurs while computing row "s" in column 4. Inlining algorithm 112 considers adding node "s" to the previous best solution in row "m" column 3 "alm". However nodes "alm" are not valid because node "r" is not in the proposed solution. Inlining algorithm 112 backs up again and considers adding nodes "rs" to the previous best solution in row "m" column 2 (i.e., nodes "ar"), however, inlining algorithm 112 finds that node "r" is in the solution "ar". The overlap between the set of nodes inlining algorithm 112 is considering adding and the previous solution in column 2 is detected, and without further backtracking, a suboptimal solution may occur. Inlining algorithm 112 then looks back up column 2 until a solution is found that does not contain any of the nodes inlining algorithm 112 is trying to add. In doing so, inlining algorithm 112 finds row "1" column 2 "al" and adds nodes "rs" to the solution it to produce nodes "alrs". This is an example of the second backtracking mechanism (e.g. while loop 704), in the inlining algorithm 112 operation that deoptimizes a previous solution.

When considering node "s" with a cost budget of 5, or 6, nodes "alrms" are now the optimal solution and provide a benefit of 31. When considering node "n" with a cost budget of 1, the only option is node "a". With a cost budget of 2, the optimal solution for row "n" are nodes "ar". When considering node "n" with a cost budget of 3, the optimal solution is nodes "ars". When considering node "n" with a cost budget of 4, inlining algorithm determines nodes "almn" to be the optimal solution. With a cost budget of 5, the optimal solution when considering node "n" is nodes "alrmn" and with for a cost budget of 6, the optimal solution for node "n" is nodes "alrmns".

The next node in the IDT of FIG. 6 to consider is node "t". The optimal solutions for node "t" for cost budgets 1, 2, and 3, remain the same as node "n" (e.g., "a" for a cost budget of 1, "ar" for a cost budget of 2, and "ars" for a cost budget of 3). When considering node "t" and a cost budget of 4, inlining algorithm 112 determines that the optimal solution is nodes "arst". When considering node "t" for a cost budget of 5, the optimal solution is nodes "alrst". For a cost budget of 6, inlining algorithm 112 determines that optimal solution is nodes "alrmst". In the example embodiment of FIG. 8, the computation of row "t" for a budget of 5 requires another multi-step backtrack resulting in inlining algorithm 112 considering adding nodes "st" and nodes "alr" from row "r" column 3.

Two key differences between inlining algorithm 112 and existing dynamic programming solutions to problems such as the knapsack problem are: (i) constraints on the order of node consideration, where the constraints serve to ensure every node is considered only after all of the node's ancestors are considered, and nodes are included in order of increasing cumulative benefit with lowest cumulative cost used to break ties to allow the generation of all intermediate solutions at a given cost budget to simplify backtracking in subsequent iterations of the algorithm, and (ii) two forms of backtracking during algorithm execution, wherein the first form allows inlining algorithm 112 to iterate backwards over the optimal solutions generated in the previous row to identify the subsequence of nodes the algorithm needs to append to and, wherein the second form allows a backwards traversal up a column of uniform cost budget to identify a previous less optimal solution to augment when there is overlap between the best-so-far solution at a given cost and the sequence of nodes being appended.

Figure 9:
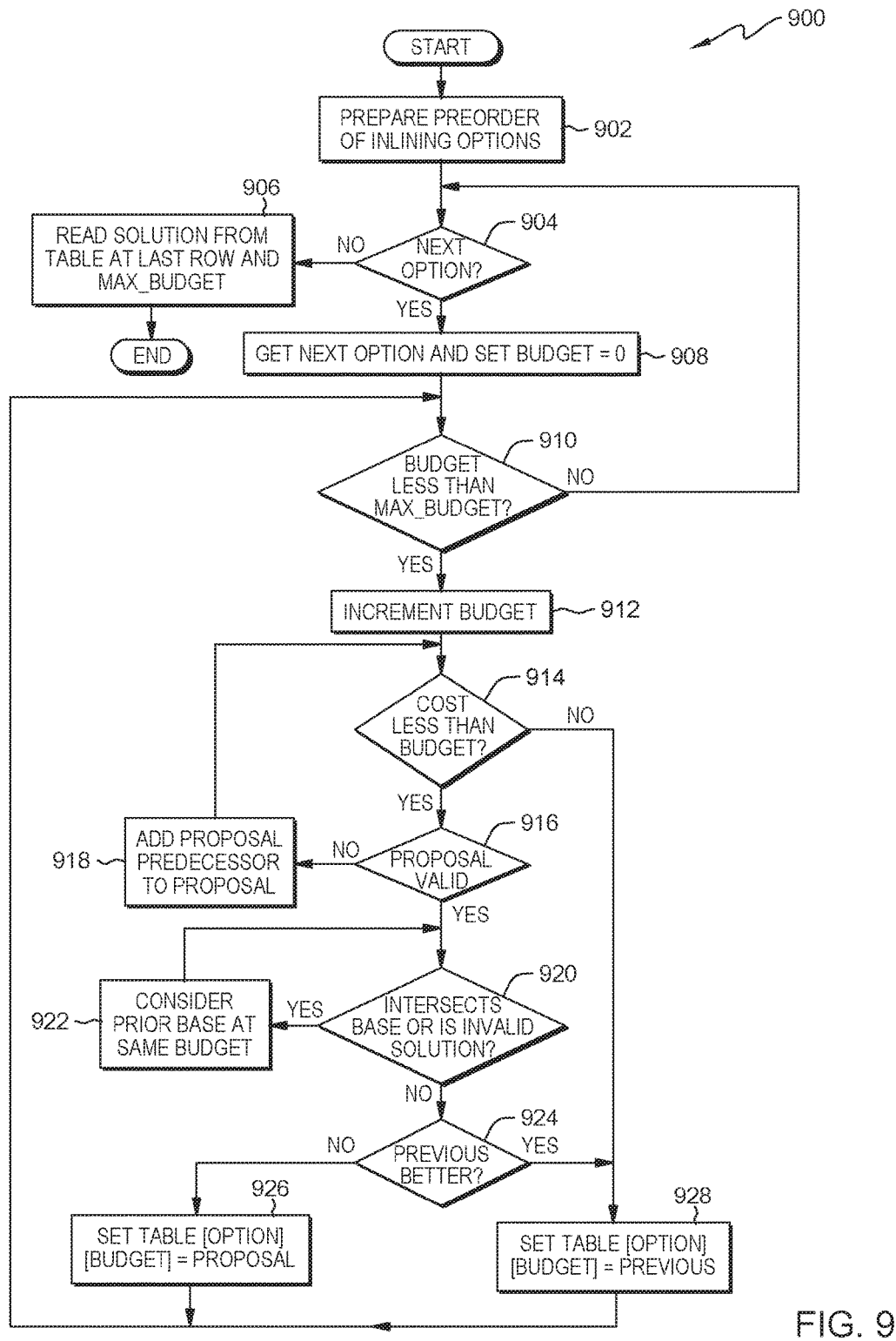
FIG. 9 is a flowchart depicting operational steps of a modified dynamic programming algorithm, on a computer within the compiler data processing environment of FIG. 1, for efficiently producing an inlining plan by introducing a constraint on the order in which nodes need to be considered and is capable of backtracking across many levels of decision making, in an embodiment in accordance with the present invention.

FIG. 9 is a flowchart, generally designated 900, depicting operational steps of a modified dynamic programming algorithm, on a computer within the compiler data processing environment of FIG. 1, for efficiently producing an inlining plan by introducing a constraint on the order in which nodes need to be considered and is capable of backtracking across many levels of decision making, in an embodiment in accordance with the present invention. Inlining algorithm 112, operating in compiler 110, is supplied with a preorder of inlining options in increasing order of cumulative benefit to determine the optimal solution for an IDT based on a determined maximum cost budget as depicted in step 902. For example, inlining algorithm 112 retrieves the externally calculated IDT that contains the associated cost and benefit metric for each node. Compiler 110 and/or inlining algorithm 112 then creates table 802 to contain the highest benefit, or optimal, inlining plan for a set of IDT nodes. As seen in FIG. 8, table 802 includes a column for each possible cost budget, up to the maximum cost budget of 6, and a row for each IDT node (e.g., "alrmsnt").

In decision step 904, inlining algorithm 112 determines if there is a next decision in the IDT. Using the example from FIG. 6, the first decision, also referred to as a node, to consider would be node "a". If there is a next decision in the IDT ("Yes" branch, decision 904), inlining algorithm 112, retrieves the next decision from the IDT and sets the budget equal to zero as depicted in step 908. For example, inlining algorithm 112 retrieves node "a" 604.

In decision step 910, inlining algorithm 112 determines if the budget is less than the maximum defined budget for the inlining plan. If inlining algorithm 112 determines that the budget is not less than the maximum defined budget for the inlining plan ("No" branch, decision 910), inlining algorithm 112 determines if there is a next option in the inlining plan as depicted in decision step 904. If inlining algorithm 112 determines that the budget is less than the maximum defined budget for the inlining plan ("Yes" branch, decision 910), inlining algorithm 112 increments the budget for the option as depicted in step 912.

In decision step 914, inlining algorithm 112 determines if the current cost (i.e., sum of the costs of a proposal) is less than the current budget. For example, node "a" was determined to have an associated cost of 1 and a benefit of 1 as depicted in the IDT in FIG. 6. As discussed in FIG. 8, when considering node "a", the only option is node "a" for all budgets because node "a" is not dependent on any other nodes. Inlining algorithm 112 determines if the associated cost of node "a" is less than the budget being considered. If inlining algorithm 112 determines that the associated cost of the node is not less than the budget ("No" branch, decision 914), inlining algorithm 112 copies the previous best solution, if any, as depicted in step 928 and then determines if the budget for the current column in table 802 is less than the maximum defined budget for the inlining plan as depicted in decision step 910. If inlining algorithm 112 determines that the associated cost of the node is less than the budget ("Yes" branch, decision 914), inlining algorithm 112 determines if the proposal is valid as depicted in decision step 916.

In decision step 916, inlining algorithm 112 determines if the current proposal is valid. Using node "m" with a budget of 3 as discussed in FIG. 8, compiler 110, with inlining algorithm 112, determines that the optimal solution is "alm". Compiler 110 and inlining algorithm 112 then determine if the proposal is valid. As discussed in FIG. 8, when considering node "m" and looking at row "r" column 2, node "m" could be added to the previous best solution "ar" to make "arm". The solution "arm" is invalid because "arm" does not contain the ancestor node "l" for node "m". If compiler 110 and inlining algorithm 112 determine that the current proposal is invalid ("No" branch, decision 916), inlining algorithm 112 then adds the proposal's predecessor to the proposal as depicted in step 918. Using the previous example for node "m", inlining algorithm 112 continues back across row "r" and considers adding "lm" to the solution in row r column 1 to produce "alm". The solution "alm" is a valid choice and so when comparing "alr" with "alm" inlining algorithm 112 chooses "alm" due to "alm" having a higher total benefit. In doing this, inlining algorithm 112 effectively undoes the choice to include "r" in the solution. If compiler 110 and inlining algorithm 112 determine that the current proposal is valid ("Yes" branch, decision 916), inlining algorithm 112 then determines if the proposal intersects the base or is an invalid solution as depicted in decision step 920.

In decision step 920, inlining algorithm 112 determines if the proposal intersects the base or is an invalid solution. In the previous example for node "s", inlining algorithm 112 considers adding node "s" to the previous best in row "m" column 3 "alm". However nodes "alms" are not valid because node "r" is not in the proposed solution. Inlining algorithm 112 backs up again and considers adding nodes "rs" to the previous best solution in row "m" column 2 (i.e., nodes "ar"), however, inlining algorithm 112 finds that node "r" is in the solution "ar". If inlining algorithm 112 determines that the proposal intersects the base or is an invalid solution ("Yes" branch, decision 920), inlining algorithm 112 considers the prior base at the same budget as depicted in step 922. If inlining algorithm 112 determines that the proposal does not intersect the base or is not an invalid solution ("No" branch, decision 920), inlining algorithm 112 determines if the previous proposal is better than the current proposal as depicted in decision step 924.

In decision step 924, inlining algorithm 112 determines if the previous proposal is better than the current proposal. Referring again the previous example for node "s", inlining algorithm 112 then looks back up column two until a solution is found that does not contain any of the nodes inlining algorithm 112 is trying to add. In doing so inlining algorithm 112 finds row "l" column 2 "al" and adds nodes "rs" to the solution it to produce nodes "alrs". If compiler 110 and inlining algorithm 112 determine that the previous solution is not better than the current solution ("No" branch, decision 924), compiler 110 and inlining algorithm 112 set the current solution in table 802 for the node at the indicated budget (step 926) and then determines if the budget for the current column in table 802 is less than the maximum defined budget for the inlining plan as depicted in decision step 910. If compiler 110 and inlining algorithm 112 determine that the previous solution is better than the current solution ("Yes" branch, decision 924), compiler 110 and inlining algorithm 112 set the previous solution in table 802 for the node at the indicated budget (step 928) and then determines if the budget for the current column in table 802 is less than the maximum defined budget for the inlining plan as depicted in decision step 910.

If there is no next decision in the IDT ("No" branch, decision 904), inlining algorithm 112 reads the solution from table 802 as depicted in step 906. The optimal solution is contained in table 802 as depicted in FIG. 8, in the last row in the column for the maximum budget (i.e., max_budget), as depicted in FIG. 7. For the example embodiment of FIG. 6, the optimal solution for the IDT with a maximum budget of 6, is "alrmst".

In an alternate embodiment, inlining algorithm 112 may handle scenarios in which certain inlining operations are mandatory. Stated another way, inlining algorithm 112 may simply use just one IDT node to represent a function with all of the IDTs callees (and their callees) (direct and indirect) that must be inlined as a unit. In other words, there would not be any mandatory inlining options presented to the decision algorithm, since there are no decisions to be made.

In another alternate embodiment, inlining algorithm 112 may generate the IDT lazily as the analysis proceeds, permitting it to succeed even in the presence of infinite IDTs (e.g., as with recursion) or IDTs too large to generate in full. Inlining algorithm 112 would produce an optimal inlining solution so long as IDT nodes are visited in order of increasing cumulative benefit lowest cumulative cost first. This ordering is useful because it can stop generating IDT nodes as soon as it produces an IDT whose call-chain cost exceeds the cost budget, and inlining algorithm 112 will still produce an optimal solution. An algorithm that returns IDT nodes in this order should be straightforward for someone skilled in the art.

In another alternate embodiment, the inlining options supplied to inlining algorithm 112 can represent separately inlineable portions of one or more functions. Given this input, inlining algorithm 112 will generate an optimal inlining plan where each function may be partially or totally inlined based on the cost and benefit metrics supplied. Stated another way, inlining algorithm 112 will produce optimal partial inlining plans for pluralities of nodes each corresponding to a single function.

In another alternate embodiment, it is possible to extend inlining algorithm 112 to operate on general directed acyclic graphs rather than just trees.

FIG. 10 depicts a block diagram, generally designated 1000, of components of a computer executing a modified dynamic programming algorithm, in an embodiment in accordance with the present invention. It should be appreciated that FIG. 10 provides only an illustration of one implementation and does not imply any limitations with regard to the environments in which different embodiments may be implemented. Many modifications to the depicted environment may be made.

Computer 102 includes communications fabric 1002, which provides communications between computer processor(s) 1004, memory 1006, persistent storage 1008, communications unit 1010, and input/output (I/O) interface(s) 1012. Communications fabric 1002 can be implemented with any architecture designed for passing data and/or control information between processors (such as microprocessors, communications and network processors, etc.), system memory, peripheral devices, and any other hardware components within a system. For example, communications fabric 1002 can be implemented with one or more buses.

Memory 1006 and persistent storage 1008 are computer readable storage media. In this embodiment, memory 1006 includes random access memory (RAM) 1014 and cache memory 1016. In general, memory 1006 can include any suitable volatile or non-volatile computer readable storage media.

Compiler 110 and inlining algorithm 112 are stored in persistent storage 1008 for execution by one or more of the respective computer processors 1004 via one or more memories of memory 1006. In this embodiment, persistent storage 1008 includes a magnetic hard disk drive. Alternatively, or in addition to a magnetic hard disk drive, persistent storage 1008 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer readable storage medium that is also part of persistent storage 1008.

Communications unit 1010, in these examples, provides for communications with other data processing systems or devices, including resources of network 114. In these examples, communications unit 1010 includes one or more network interface cards. Communications unit 1010 may provide communications through the use of either or both physical and wireless communications links. Compiler 110 and inlining algorithm 112 may be downloaded to persistent storage 1008 through communications unit 1010.

I/O interface(s) 1012 allows for input and output of data with other devices that may be connected to computer 102. For example, I/O interface 1012 may provide a connection to external devices 1018 such as a keyboard, keypad, a touch screen, and/or some other suitable input device. External devices 1018 can also include portable computer readable storage media such as, for example, thumb drives, portable optical or magnetic disks, and memory cards. Software and data used to practice embodiments of the present invention, e.g., compiler 110 and inlining algorithm 112, can be stored on such portable computer readable storage media and can be loaded onto persistent storage 1008 via I/O interface(s) 1012. I/O interface(s) 1012 also connect to a display 1020.

Display 1020 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving, by one or more computer processors, an ordered list of inlining options for a computer program and a relational data structure representing dependencies between the inlining options, wherein each inlining option includes an associated cost value and an associated benefit value;
   determining, by one or more computer processors, inlining plans for each option of the ordered list, wherein each inlining plan corresponds to a cost budget that is less than or equal to a maximum cost budget, and wherein each inlining plan includes a set of inlining options from the ordered list that provides a maximum combined benefit value for a combined cost value that is equal to or less than the inlining plan's respective cost budget, subject to the following conditions:
   each inlining option of the set precedes, or is, the inlining plan's respective inlining option in the ordered list, and
   for each inlining option of the set, the set also includes each inlining option that the respective inlining option is dependent on, as represented by the relational data structure; and
   determining, by one or more computer processors, a maximum-benefit inlining plan for a selected inlining option of the ordered list based, at least in part, on the determined inlining plans and the maximum cost budget, wherein the maximum-benefit inlining plan includes a set of inlining options from the ordered list, and wherein the inlining options of the maximum-benefit inlining plan provide a maximum combined benefit value for a combined cost value that is equal to or less than the maximum cost budget.

2. The method of claim 1, further comprising:
   performing, by one or more computer processors, inline function expansion for each inlining option of the set of inlining options according to the determined maximum-benefit inlining plan.

3. The method of claim 1, wherein inlining options of the ordered list are ordered based on a cumulative benefit value, wherein the cumulative benefit value for an inlining option is determined by adding the associated benefit value of the respective inlining option to the associated benefit values of the inlining options that the respective inlining option is dependent on, as represented by the relational data structure.

4. The method of claim 1, wherein:
   the relational data structure is an inlining dependency tree;
   the inlining dependency tree includes a plurality of nodes representing the inlining options and a plurality of directed edges representing dependencies between the inlining options; and
   the inlining options for the ordered list are ordered according to a placement of the inlining options' respective nodes in the inlining dependency tree.

5. The method of claim 1, further comprising:
   determining, by one or more processors, at least one maximum-benefit inlining plan for each inlining option of the ordered list; and
   performing, by one or more processors, inline function expansion for the computer program according to a determined maximum-benefit inlining plan for an inlining option that occurs last in the ordered list.

6. The method of claim 1, wherein a first plurality of inlining options corresponds to a single function of the computer program.

7. A computer program product comprising:
   one or more computer readable storage media and program instructions stored on the one or more computer readable storage media, wherein the one or more computer readable storage media are not transitory signals per se, the program instructions executable by a processor, the program instructions comprising:
   program instructions to receive an ordered list of inlining options for a computer program and a relational data structure representing dependencies between the inlining options, wherein each inlining option includes an associated cost value and an associated benefit value;
   program instructions to determine inlining plans for each option of the ordered list, wherein each inlining plan corresponds to a cost budget that is less than or equal to a maximum cost budget, and wherein each inlining plan includes a set of inlining options from the ordered list that provides a maximum combined benefit value for a combined cost value that is equal to or less than the inlining plan's respective cost budget, subject to the following conditions:
   each inlining option of the set precedes, or is, the inlining plan's respective inlining option in the ordered list, and
   for each inlining option of the set, the set also includes each inlining option that the respective inlining option is dependent on, as represented by the relational data structure; and
   program instructions to determine a maximum-benefit inlining plan for a selected inlining option of the ordered list based, at least in part, on the determined inlining plans and the maximum cost budget, wherein the maximum-benefit inlining plan includes a set of inlining options from the ordered list, and wherein the inlining options of the maximum-benefit inlining plan provide a maximum combined benefit value for a combined cost value that is equal to or less than the maximum cost budget.

8. The computer program product of claim 7, further comprising:
   program instructions to perform inline function expansion for each inlining option of the set of inlining options according to the determined maximum-benefit inlining plan.

9. The computer program product of claim 7, wherein inlining options of the ordered list are ordered based on a cumulative benefit value, wherein the cumulative benefit value for an inlining option is determined by adding the associated benefit value of the respective inlining option to the associated benefit values of the inlining options that the respective inlining option is dependent on, as represented by the relational data structure.

10. The computer program product of claim 7, wherein:
    the relational data structure is an inlining dependency tree;
    the inlining dependency tree includes a plurality of nodes representing the inlining options and a plurality of directed edges representing dependencies between the inlining options; and
    the inlining options for the ordered list are ordered according to a placement of the inlining options' respective nodes in the inlining dependency tree.

11. The computer program product of claim 7, further comprising:
    program instructions to determine at least one maximum-benefit inlining plan for each inlining option of the ordered list; and
    program instructions to perform inline function expansion for the computer program according to a determined maximum-benefit inlining plan for an inlining option that occurs last in the ordered list.

12. The computer program product of claim 7, wherein a first plurality of inlining options corresponds to a single function of the computer program.

13. A computer system comprising:
    one or more computer processors;
    one or more computer readable storage media, wherein the one or more computer readable storage media are not transitory signals per se;
    program instructions stored on the computer readable storage media for execution by at least one of the one or more processors, the program instructions comprising:
    program instructions to receive an ordered list of inlining options for a computer program and a relational data structure representing dependencies between the inlining options, wherein each inlining option includes an associated cost value and an associated benefit value;
    program instructions to determine inlining plans for each option of the ordered list, wherein each inlining plan corresponds to a cost budget that is less than or equal to a maximum cost budget, and wherein each inlining plan includes a set of inlining options from the ordered list that provides a maximum combined benefit value for a combined cost value that is equal to or less than the inlining plan's respective cost budget, subject to the following conditions:
    each inlining option of the set precedes, or is, the inlining plan's respective inlining option in the ordered list, and
    for each inlining option of the set, the set also includes each inlining option that the respective inlining option is dependent on, as represented by the relational data structure; and
    program instructions to determine a maximum-benefit inlining plan for a selected inlining option of the ordered list based, at least in part, on the determined inlining plans and the maximum cost budget, wherein the maximum-benefit inlining plan includes a set of inlining options from the ordered list, and wherein the inlining options of the maximum-benefit inlining plan provide a maximum combined benefit value for a combined cost value that is equal to or less than the maximum cost budget.

14. The computer system of claim 13, further comprising:
    program instructions to perform inline function expansion for each inlining option of the set of inlining options according to the determined maximum-benefit inlining plan.

15. The computer system of claim 13, wherein inlining options of the ordered list are ordered based on a cumulative benefit value, wherein the cumulative benefit value for an inlining option is determined by adding the associated benefit value of the respective inlining option to the associated benefit values of the inlining options that the respective inlining option is dependent on, as represented by the relational data structure.

16. The computer system of claim 13, wherein:
the relational data structure is an inlining dependency tree;
the inlining dependency tree includes a plurality of nodes representing the inlining options and a plurality of directed edges representing dependencies between the inlining options; and
the inlining options for the ordered list are ordered according to a placement of the inlining options' respective nodes in the inlining dependency tree.

17. The computer system of claim 13, further comprising:
program instructions to determine at least one maximum-benefit inlining plan for each inlining option of the ordered list; and
program instructions to perform inline function expansion for the computer program according to a determined maximum-benefit inlining plan for an inlining option that occurs last in the ordered list.

* * * * *